United States Patent
Beglerovic et al.

(10) Patent No.: US 12,243,323 B2
(45) Date of Patent: Mar. 4, 2025

(54) ANALYSIS OF DYNAMIC SPATIAL SCENARIOS

(71) Applicant: AVL LIST GMBH, Graz (AT)

(72) Inventors: Halil Beglerovic, Graz (AT); Jonas Rübsam, Graz (AT); Steffen Metzner, Weiz (AT)

(73) Assignee: AVL List GmbH, Graz (AT)

( * ) Notice: Subject to any disclaimer, the term of this patent is extended or adjusted under 35 U.S.C. 154(b) by 518 days.

(21) Appl. No.: 17/275,810

(22) PCT Filed: Sep. 13, 2019

(86) PCT No.: PCT/AT2019/060301
§ 371 (c)(1),
(2) Date: Feb. 7, 2022

(87) PCT Pub. No.: WO2020/051618
PCT Pub. Date: Mar. 19, 2020

(65) Prior Publication Data
US 2022/0237889 A1    Jul. 28, 2022

(30) Foreign Application Priority Data
Sep. 14, 2018   (AT) .............................. A 50788/2018

(51) Int. Cl.
*G06V 20/58*        (2022.01)
*G06T 11/20*        (2006.01)
(Continued)

(52) U.S. Cl.
CPC ............ *G06V 20/58* (2022.01); *G06T 11/203* (2013.01); *G06V 10/426* (2022.01); *G06V 10/62* (2022.01); *G06V 10/82* (2022.01); *G06V 2201/08* (2022.01)

(58) Field of Classification Search
CPC ........ G06V 20/58; G06V 10/82; G06V 10/62; G06V 10/426; G06V 2201/08; G06T 11/203
(Continued)

(56) References Cited

U.S. PATENT DOCUMENTS

| | | | |
|---|---|---|---|
| 2011/0279254 A1* | 11/2011 | Raste | ..................... B62D 7/159 |
| | | | 701/41 |
| 2018/0046910 A1 | 2/2018 | Greene | |

(Continued)

FOREIGN PATENT DOCUMENTS

| | | |
|---|---|---|
| CN | 103530605 | 1/2014 |
| CN | 106537175 | 3/2017 |

(Continued)

OTHER PUBLICATIONS

Barton et al. "Towards a Complete Human Driver Model: The Effect of Vision on Driving Performance," IEEE, Proceedings of the American Control Conference, Jun. 2006, pp. 2591-2598.
(Continued)

*Primary Examiner* — Michael R Neff
(74) *Attorney, Agent, or Firm* — Sheridan Ross P.C.

(57) ABSTRACT

The invention relates to a method and a system for preparing data on dynamic spatial scenarios, to a computer-supported method, to a system for training artificial neural networks, to a computer-supported method, and to a system for analyzing sensor data. A display of a time curve of an angular sector covered by another object from the perspective of an ego object is generated. The time curve is ascertained from sensor data, and the sensor data characterizes a dynamic spatial scenario with respect to the ego object and at least one other object.

14 Claims, 5 Drawing Sheets

Figure 1:
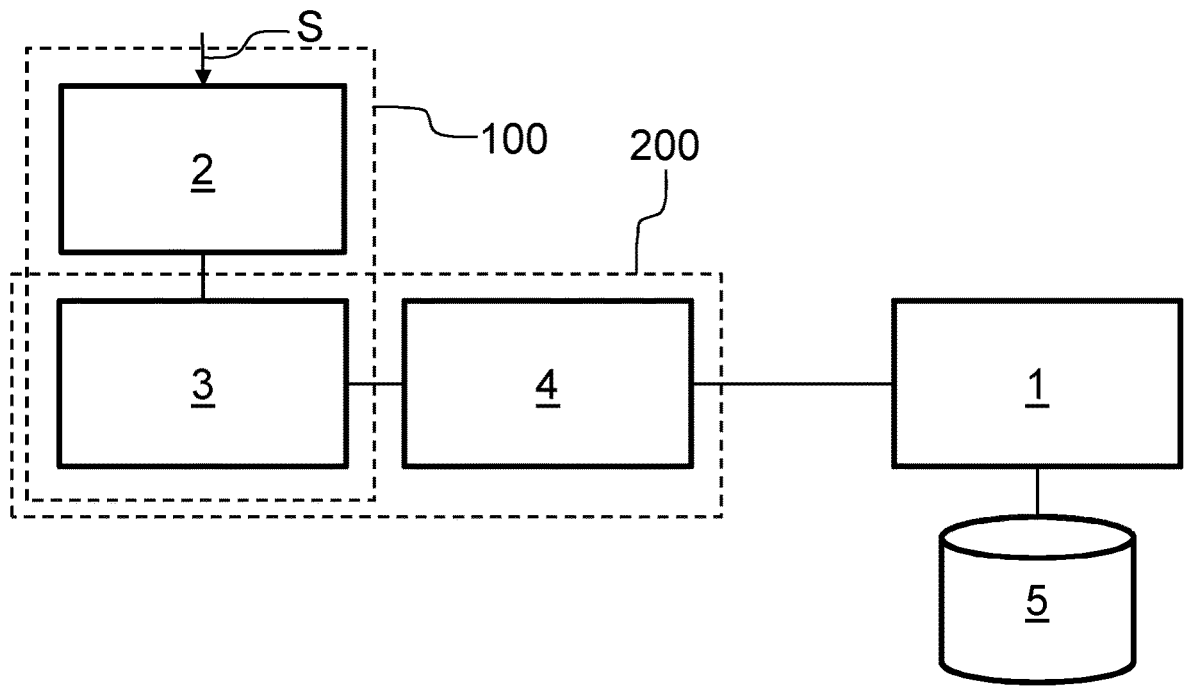

(51) Int. Cl.
  *G06V 10/426* (2022.01)
  *G06V 10/62* (2022.01)
  *G06V 10/82* (2022.01)
(58) Field of Classification Search
  USPC .......................................................... 382/103
  See application file for complete search history.

(56) References Cited

U.S. PATENT DOCUMENTS

| | | | |
|---|---|---|---|
| 2018/0134288 A1 | 5/2018 | Schulter et al. | |
| 2018/0164812 A1 | 6/2018 | Oh et al. | |
| 2018/0232204 A1* | 8/2018 | Ghatage | G06F 7/02 |
| 2019/0384304 A1* | 12/2019 | Towal | G06N 3/08 |

FOREIGN PATENT DOCUMENTS

| | | |
|---|---|---|
| CN | 107003398 | 8/2017 |
| EP | 3229206 | 10/2017 |
| JP | H07-65294 | 3/1995 |
| JP | H09-145833 | 6/1997 |
| JP | H10-338057 | 12/1998 |
| JP | 2011-221005 | 11/2011 |
| JP | 2018-92505 | 6/2018 |
| WO | WO 03/019233 | 3/2003 |

OTHER PUBLICATIONS

Cara et al. Classification for safety-critical car-cyclist scenarios using machine learning, IEEE, 18th International Conference on Intelligent Transportation Systems, S., pp. 1955-2000.

Gruner et al. "Spatiotemporal representation of driving scenarios and classification using neural networks," IEEE Intelligent vehicles Symposium, Jun. 2017, pp. 1782-1788.

Li et al. "Non-lane-discipline-based car-following model considering the effect of visual angle," Nonlinear Dynamics, Apr. 2016, vol. 85, No. 3, pp. 1901-1912.

Piaggio et al. "Autonomous navigation based on a dynamic world representation," Proceedings of the Second IEEE International Conference on Engineering of Complex Computer Systems, Oct. 21, 1996, pp. 152-155.

Official Action with machine translation for Austria Patent Application No. A 50788/2018, dated Aug. 27, 2019, 3 pages.

Decision to Grant with machine translation for Austria Patent Application No. A 50788/2018, dated Mar. 5, 2020, 5 pages.

International Search Report and Written Opinion with machine translation for International (PCT) Patent Application No. PCT/AT2019/060301, dated Dec. 16, 2019, 18 pages.

English translation of the International Search Report for International (PCT) Patent Application No. PCT/AT2019/060301, dated Dec. 16, 2019, 3 pages.

I, Meisho et al. "Car Model Recognition based on Inboard Car Sensor Information System Using Multiple Structure Neural Networks," Video Information Media Magazine, 2005, vol. 59, No. 4, pp. 621-628 (English abstract).

Sato et al. "Automobile Detection and Effects of Condition Dependency by a Recurrent Neural Network," Image Lab, Ja. 2005, vol. 16, No. 1, pp. 45-52.

Official Action with English Translation for China Patent Application No. 201980060057.1, dated Nov. 2, 2023, 16 pages.

Official Action with English Translation for Japan Patent Application No. 2021-514045, dated Nov. 20, 2023, 8 pages.

Official Action with English Translation for Japan Patent Application No. 2021-514045, dated Jun. 5, 2023, 8 pages.

Official Action with English Translation for China Patent Application No. 201980060057.1, dated Jul. 4, 2024, 16 pages.

\* cited by examiner

ANALYSIS OF DYNAMIC SPATIAL SCENARIOS

CROSS REFERENCE TO RELATED APPLICATIONS

This application is a national stage application under 35 U.S.C. 371 and claims the benefit of PCT Application No. PCT/AT2019/060301 having an international filing date of 13 Sep. 2019, which designated the United States, which PCT application claimed the benefit of Austria Patent Application No. A50788/2018 filed 14 Sep. 2018, the disclosures of each of which are incorporated herein by reference in their entireties.

The present invention relates to a method and a system for preparing data from dynamic spatial scenarios for processing by an artificial neural network, a computer-supported method and a system for training an artificial neural network as well as a computer-supported method and a system for analyzing sensor data.

Modern vehicles are increasingly being equipped with advanced driver assistance systems (ADAS) which support the driver in certain driving situations. The support ranges from merely displaying potentially relevant information (e.g. a lane change assistant issuing a warning) to semi-autonomous interventions (e.g. an anti-lock braking system regulating the torque applied to the axles) to fully autonomous interventions in the vehicle control (e.g. an adaptive cruise control (ACC) adaptively regulating velocity).

Usually forming the basis for such driver assistance systems is sensor data such as signals provided by ultrasonic sensors, radar sensors or cameras, on the basis of which the present driving situation can be determined and the function of the respective driver assistance system performed in response. Particularly in the case of driver assistance systems which (autonomously) intervene in the control of the vehicle, the present driving situation must be able to be classified with the highest possible reliability based on the sensor data.

In general, certain rules or respectively criteria associated with a driving situation are thereby established which, if met, enables concluding that a known driving situation exists. Satisfying the rule or respectively criteria thereby acts for example as a trigger for an action of the driver assistance system. For example, in a case in which a nearby vehicle ahead of the designated ego vehicle equipped with the driver assistance system merges into the same lane, a traffic scenario can be recognized from the decreasing of a sensor-detected transverse distance perpendicular to the neighboring vehicle's direction of travel and which ultimately at least substantially reaches the value of 0 when the neighboring vehicle is located directly in front of the ego vehicle.

The programming of algorithms suited to (reliably) recognizing such driving situations or scenarios respectively is generally extremely complex and in some cases even impossible, particularly when a plurality of driving situations are to be factored in. Machine learning is therefore increasingly being used in order to automatically find characteristics within sensor data that indicate a driving situation. The underlying sensor data is typically sensor data which is for example classified manually in respect of different driving situations (labeled sensor data), on the basis of which an artificial neural network can for example extract the relevant criteria for the respective driving situation. The classified sensor data thereby generally needs to be in a predefined form; i.e. accordingly prepared, so as to be able to be meaningfully processed by the artificial neural network.

So-called grid maps, which display the relevant driving situations from a bird's eye view, represent one approach to such preparation. The dynamics of an underlying driving situation are thereby depicted by for example displaying all the positions occupied by the respective road users over time in the respective grid map.

Such grid maps are discussed for example in Gruner et. al. "Spatiotemporal Representation of Driving Scenarios and Classification using Neural Networks," 2017 IEEE Intelligent Vehicle Symposium, p. 1782-1788.

Various algorithms for classifying vehicle/cyclist scenarios are compared in Cara and de Gelder, "Classification for safety-critical car-cyclist scenarios using machine learning," 2015 IEEE 18th International Conference on Intelligent Transportation Systems, p. 1955-2000. In the process, a training set of labeled objects is used in supervised learning to train so-called classifiers. After training, the classifiers are able to characterize a new unknown scenario by assigning it to an assessed class.

It is a task of the present invention to further improve the preparation of sensor data suited to characterizing a dynamic spatial scenario with respect to an ego object and at least one other object. In particular a task of the invention is improving the preparing of such sensor data for processing by an artificial neural network, particularly to prevent or at least reduce loss of information during preparation.

This task is solved by a method and a system for data preparation, a method and a system for training an artificial neural network, and a method and system for analyzing sensor data according to the independent claims.

A first aspect of the invention relates to a method for preparing data from dynamic spatial scenarios, in particular traffic scenarios, for processing by an artificial neural network. A display is thereby generated of a time curve of an angular sector covered by another object, in particular another vehicle, from the perspective of an ego object, in particular an ego vehicle. The time curve is to that end ascertained from sensor data, wherein the sensor data is suitable for characterizing a dynamic spatial scenario with respect to the ego object and at least one other object.

A spatial scenario within the meaning of the invention is formed in particular from a temporal sequence of spatial, in particular static, scenes. The spatial scenes thereby indicate for example the spatial arrangement of the at least one other object relative to the ego object, e.g. the constellations of road users. A spatial scenario can in particular include a driving situation in which a driver assistance system at least partially controls the vehicle designated the ego vehicle equipped with the driver assistance system; e.g. autonomously performs at least one vehicle function of the ego vehicle.

Dynamic within the meaning of the invention in particular denotes a chronological sequence or time curve respectively. For example, traffic scenarios are dynamic since the individual road users move relative to each other over time; i.e. their positions relative to one another change.

A display within the meaning of the invention is in particular a graphical display, e.g. a graph or a diagram. The display preferably contains an image, particularly a two-dimensional or three-dimensional image. Alternatively or additionally, the display can also contain a mathematical representation, e.g. an assignment rule or a function respectively. For example, the display can show the time curve of an angular sector covered by the other object from the perspective of the ego object in a map-like image.

Sensor data within the meaning of the invention is in particular data generated by real or simulated sensors, in particular environmental sensors, particularly in the form of signals; i.e. real or simulated sensor data. The sensors are thereby preferably configured to detect the ego vehicle's surroundings and generate corresponding sensor data such that the sensor data characterizes the surroundings of the ego vehicle. The sensor data is preferably sensor fusion data obtained from a combination of signals provided by the sensors and may possibly have already been processed, at least to a certain extent.

An ego object within the meaning of the invention is in particular that object from the perspective of which the dynamic spatial scenario is viewed. An ego object can for example be an (ego) vehicle from the point of view of which a traffic scenario is detected and analyzed and/or evaluated as required, for example so as to be able to appropriately control a driver assistance system or react to the detected traffic scenario respectively. Thus, sensor data which is for example prepared for further processing is generated preferably by environmental sensors of the ego vehicle, wherein the environmental sensors such as for example ultrasonic sensors, radar sensors, cameras and/or the like are configured to detect the surroundings of the ego vehicle.

An angular sector within the meaning of the invention is in particular that area which is occupied by another object from the perspective of the ego object. From an ego vehicle's point of view, the angular sector for example corresponds to the area covered by another vehicle. Preferably, the angular sector is thereby defined by the cross-sectional area of the object or its contour respectively. For example, the angular sector can be defined by a maximum expansion of the cross-sectional area/contour along a predetermined direction, particularly horizontally.

The invention is in particular based on the approach of encoding into a display information relating to a dynamic spatial scenario, e.g. a traffic situation, as ascertained from sensor data. The display can thus also be considered an abstraction of the scenario and serves in particular to summarize different types of information, for example positions, translations, number of objects and/or the like.

The display is preferably generated on the basis of the chronological development of an angular sector in which an ego object's field of view is covered by another object. The angular sector thereby aids in characterizing in particular constellations of spatial scene objects relative to one another. The display is preferably a graphical image, particularly a two-dimensional or three-dimensional image, which abstractly shows both the position as well as the movement of the objects relative to one another. For example, an object's movement can be represented in the image by a shape, particularly a geometric shape.

Preferably, a characteristic shape of such an image can be found based on its analysis. The shape is thereby particularly characteristic of the dynamic spatial scenario as relates to the ego object and at least one other object. In other words, the characteristic shape represents a pattern that can be found, e.g. by an artificial neural network analyzing such a display and, if applicable, even multiple such displays generated on the basis of the sensor data.

Conversely, when the characteristic shapes or respectively patterns for different dynamic spatial scenarios are known and exist for example as templates, the corresponding dynamic spatial scenario can also be ascertained on the basis of display evaluation.

The display of a dynamic spatial scenario based on the development of the angular sector over time has the advantage of its informational content not depending, or at least only slightly depending, on variations of the scenario. While different variants of the scenario, e.g. a driving maneuver executed particularly quickly or particularly slowly, generate different images in the display, they are substantially of the same or at least similar shape.

For example, the plotting of the angular sector covered by another vehicle with respect to the field of view of an ego vehicle, and thus representing the position of the other vehicle relative to the ego vehicle, generates a pattern against time, the shape of which is characteristic of the driving maneuvers executed by the other vehicle. If, for example, the other vehicle veers away from the ego vehicle, the covered angular sector becomes somewhat smaller whereas it increases accordingly when being approached. If the other vehicle moves for example sideways to the ego vehicle in relation to the direction of travel, the covered angular sector shifts. The resultant pattern, which exhibits for example a characteristic curve, can then be reliably assigned to a driving maneuver, even if the image usually varies, for example being compressed or elongated, depending on how the driving maneuver was executed, e.g. aggressively or defensively.

The display of the temporal development of the angular sector thus makes it possible to compactly summarize different types of information. Since a time lapse is thereby shown, overlaps, e.g. of graphical elements, along with an associated loss of information, are prevented or at least reduced. At the same time, this can result for example in saving on memory space and an accelerating of sensor data evaluation. The display simultaneously enables a reliable identification of dynamic spatial scenarios.

Compared to grid maps, the display of the development of the angular sector over time has for example the advantage of the same information being able to be mapped with a much smaller dataset. In a grid map, individual pixels which are not occupied by another vehicle (i.e. "empty" pixels) do not for example contribute to the informational content able to be used for instance by an artificial neural network. In particular, by using the display of the angular sector development over time, the amount of data required to train an artificial neural network can be reduced by a factor of 27.

Overall, the present invention enables further improving the processing of sensor data. Particularly the preparing of sensor data for processing by an artificial neural network can be improved, for example by preventing or at least reducing information loss during preparation.

Preferential embodiments of the invention and their further developments are described in the following which, unless expressly excluded, can be combined with one another as desired as well as with the aspects of the invention described below.

In one preferential embodiment, the display is output to an artificial neural network or provided for processing by the artificial neural network. For example, the display can be stored on a storage medium as a data packet, in particular as a digital image, or transmitted directly to the artificial neural network via an interface. As a result, also large amounts of sensor data can be drawn on in training the artificial neural network, particularly to ascertain patterns in the display which are characteristic of a predefined scenario such for example as the shape of a figure in the display.

A second aspect of the invention relates to a computer-supported method for training an artificial neural network on the basis of sensor data suited to characterizing a known dynamic spatial scenario with respect to an ego object and at least one other object. A time curve display of an angular sector which is covered by another object, in particular another vehicle, from the perspective of an ego object, in particular an ego vehicle, is thereby generated on the basis of the sensor data. The display generated is fed to the artificial neural network together with information about the spatial scenario. The artificial neural network can thereby be trained particularly quickly and reliably to recognize patterns characteristic of different scenarios.

The spatial scenario information preferably includes a reference to a classification (label) of the scenario, with the help of which the scenario can be preferably uniquely identified. The information can thereby already be contained in the sensor data, for instance when same is simulated sensor data generated by a simulator during the simulation of a specific scenario. Alternatively, however, the information can also be fed to the artificial neural network as a separate data stream, for instance when the sensor data has already previously been analyzed and classified with respect to at least one scenario. This classification can in particular have been performed manually, for example by analyzing a stream of images corresponding to the sensor data.

A third aspect of the invention relates to a computer-supported method for analyzing sensor data suited to characterizing a dynamic spatial scenario with respect to an ego object and at least one other object. A time curve display of an angular sector which is covered by another object, in particular another vehicle, from the perspective of an ego object, in particular an ego vehicle, is thereby generated on the basis of the sensor data. The display generated is compared to at least one predefined template of a known dynamic spatial scenario. The presence of a known scenario can thereby be recognized particularly quickly and reliably on the basis of a sensor data stream such as provided by e.g. environmental sensors of a vehicle.

The predefined template is preferentially a generic display of the temporal development of the angular sector which contains, for example, all the essential characteristic patterns of a scenario. For example, the predefined template can be a display containing at least one figure, the shape of which is characteristic of a driving maneuver of a vehicle performed as part of a traffic scenario.

Preferably, the predefined template is ascertained on the basis of a plurality of displays which are characteristic of the known dynamic spatial scenario. In particular, the plurality of displays characteristic of the known scenario are averaged. For example, these displays can thereby have been previously generated from sensor data already having been classified as to scenario. As a result, a high degree of reliability can be achieved when comparing the generated display to the predefined template.

In one preferential embodiment, the dynamic spatial scenario is classified on the basis of the comparison, for instance by assigning the ascertained display to the at least one predefined template. The scenario can thereby be reliably identified and driver assistance system reactions triggered as necessary.

Preferably, a measure of similarity is ascertained when comparing the generated display to the predefined template, on the basis of which the scenario can for example be classified and the generated display assigned to a scenario. It is for example conceivable to assign the generated display to that scenario with the predefined templates best suited to mapping the generated display by means of an elastic matching or nonlinear template matching method; i.e. with a maximum method-supported measure of similarity. The scenario can thereby be identified particularly reliably.

In a further preferential embodiment, a template for a new dynamic spatial scenario is defined when the display generated cannot be assigned to the at least one predefined template of a known dynamic spatial scenario. New dynamic scenarios can thus be identified, in particular classified. In particular, new dynamic scenarios can thus essentially be identified in real time.

For example, a template can be defined for a new dynamic spatial scenario when a measure of similarity ascertained when comparing the generated display does not reach a predetermined threshold. A catalog of predefined templates of known dynamic spatial scenarios can thus be easily generated, particularly in real time.

In a further preferential embodiment, the generated display furthermore depicts a distance, an in particular transversal distance, of the ego object to the other object and/or a speed, an in particular transversal speed, of the ego object, whereby the distance and/or the speed is/are likewise ascertained from sensor data. The corresponding distance or respectively speed information is thereby preferably encoded in the display so as to be able to be read out independently of at least the spatial arrangement of the other object relative to the ego object. Factoring in the distance and/or the speed enables a particularly reliable identification of an existing dynamic spatial scenario. Factoring in the distance and/or the speed in particular also enables particularly subtle differentiation between different dynamic spatial scenarios.

The speed of the ego object can in particular be a transversal speed; i.e. a speed component substantially perpendicular to the dominant (longitudinal) direction of movement, e.g. direction of travel, of the ego object. Preferably, the ego object speed rendered in the generated display is formed exclusively from the transversal speed.

In the case of straight forward travel, the transversal speed of the ego vehicle is e.g. zero, whereas when changing lanes it increases to a maximum value and then falls back down to zero again.

Based on the speed depicted in the display, a differentiation can be made between, for example, a lane change made by the ego vehicle and a lane change made by another vehicle. Since these two driving maneuvers do not differ from one another in terms of the relative movement of the ego vehicle and the other vehicle; i.e. the display shows e.g. the same figure in both cases, only by factoring in the transversal speed of the ego vehicle can a reliable conclusion be made as to which vehicle is changing lanes.

The distance between the ego object and the other object can in particular be a transversal distance; i.e. a distance component substantially perpendicular to the dominant (longitudinal) direction of movement, e.g. direction of travel, of the ego object. Preferably, the distance between the ego object and the other object rendered in the generated display is formed exclusively from the transversal distance.

If, for example, another vehicle in an adjacent lane passes the ego vehicle, the absolute distance between the ego vehicle and the other vehicle changes. The transversal distance, however, remains constant as long as neither the ego vehicle nor any other vehicle leaves its respective lane. The change in transversal distance therefore allows (further) conclusions to be drawn about the executed maneuver, for instance in the context of a scenario.

In a further preferential embodiment, the time curve of an angular sector is represented by a line, the width of which indicates a value of the respectively present angular sector. Alternatively or additionally, a distance of the ego object to the other object and/or a speed of the ego object is/are depicted by a stored value or a coloration at the respective point on the line corresponding to the time of the presence of the distance and/or the speed.

The stored value or the coloration respectively of the line can alternatively or additionally be ascertained by an in particular generic function in which the distance, in particular transversal distance, between the ego object and the other object and/or the speed, in particular transversal speed, are entered as input variables. By means of the function, the distance and the speed can for example be added or multiplied, potentially factoring in a weighting. In particular, the speed can be weighted with the distance or the distance weighted with the speed. The information thereby obtained and depicted in the display or depicted by the stored value enables a particularly reliable and detailed differentiation of driving maneuvers or the corresponding dynamic spatial scenarios respectively.

The function is thereby preferably used to manipulate the perception of an artificial neural network. In other words, the function can be selected such that the resulting displays influence the pattern recognized by the artificial neural network. This thus enables particularly reliable differentiating of different dynamic spatial scenarios.

Alternatively or additionally, parameters other than the distance between the ego object and the other object and/or the speed of the ego object can also be selected as input variables of the function. The parameters can for example be selected as a function of the in particular known dynamic spatial scenario. Preferably, parameters which at least partially characterize the dynamic spatial scenario are selected as input variables.

A fourth aspect of the invention relates to a system for preparing data from dynamic spatial scenarios, in particular traffic scenarios, for processing by an artificial neural network. The system comprises a determination module configured to ascertain from sensor data a time curve of an angular sector which, from the perspective of an ego object, in particular an ego vehicle, is covered by another object, in particular another vehicle. The sensor data is thereby suited to characterizing a dynamic spatial scenario with respect to the ego object and at least one other object. The system further comprises a generation module configured to generate a display of the ascertained time curve.

A fifth aspect of the invention relates to a system for training an artificial neural network on the basis of sensor data suited to characterizing a known dynamic spatial scenario with respect to an ego object and at least one other object. The system comprises a generation module which is configured to generate a display of a time curve of an angular sector which, from the perspective of an ego object, in particular an ego vehicle, is covered by another object, in particular another vehicle, on the basis of the sensor data. The system further comprises an interface configured to feed the generated display together with information about the spatial scenario to the artificial neural network.

A sixth aspect of the invention relates to a system for analyzing sensor data suited to characterizing a dynamic spatial scenario with respect to an ego object and at least one other object. The system comprises a generation module configured to generate a display of a time curve of an angular sector which, from the perspective of an ego object, in particular an ego vehicle, is covered by another object, in particular another vehicle, on the basis of the sensor data. The system further comprises a comparison module configured to compare the generated display to at least one predefined template of a known dynamic spatial scenario.

The features and advantages described with respect to the first aspect of the invention and advantageous embodiment thereof also apply, at least where technically sensible, to the second, third, fourth, fifth and sixth aspect of the invention and advantageous embodiment thereof and vice versa.

Figure 2:
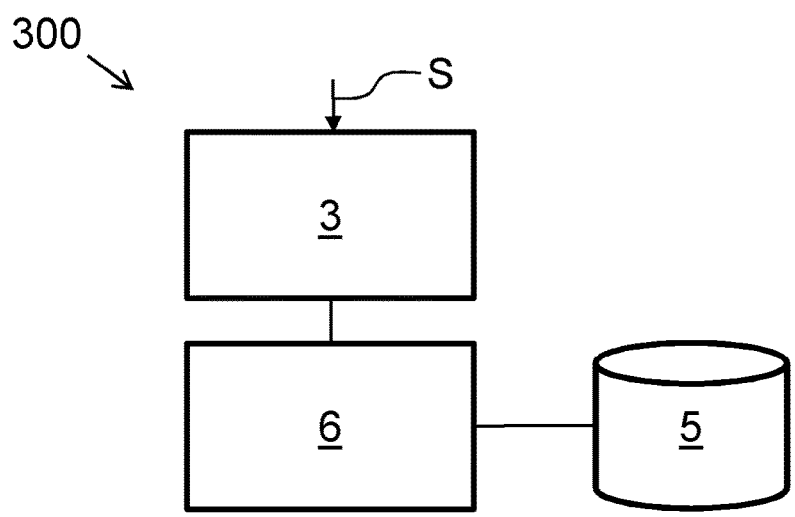
Figure 3:
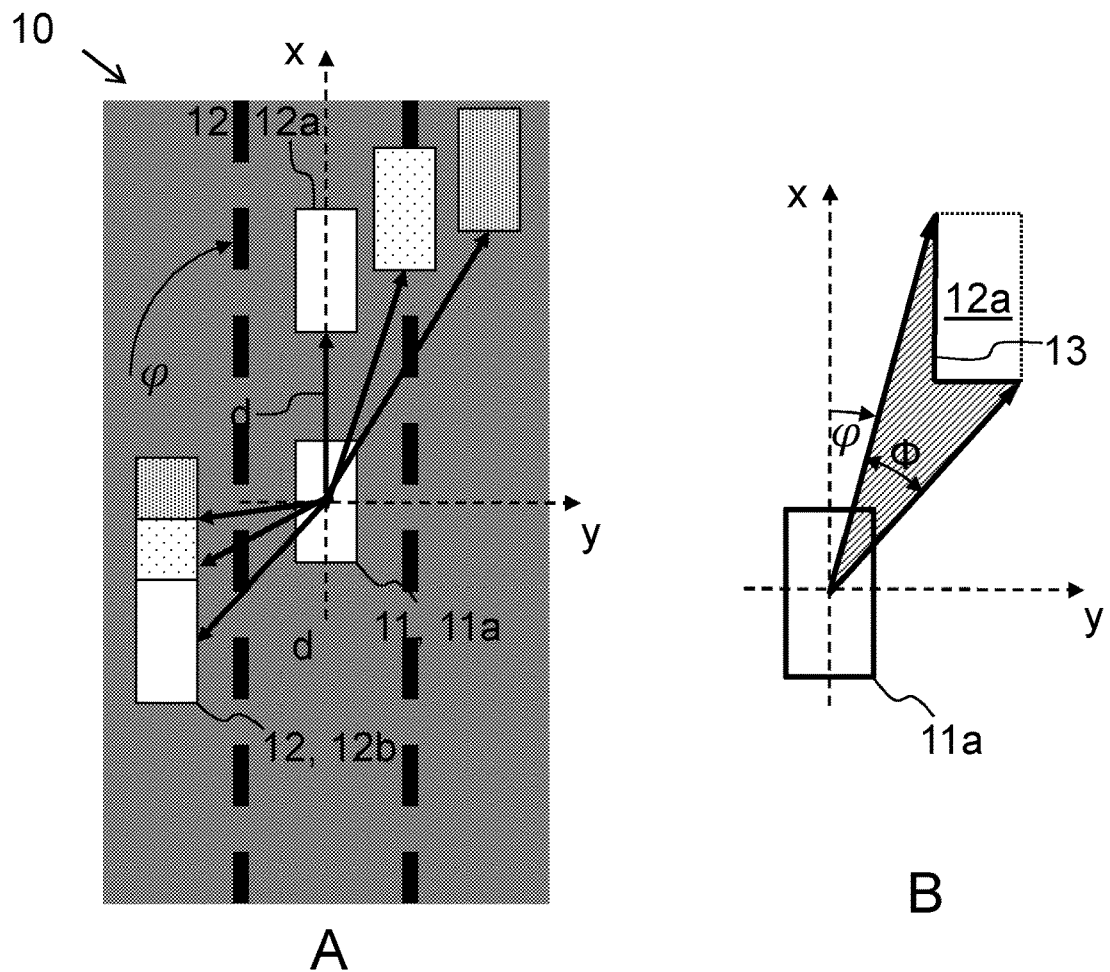
Figure 4:
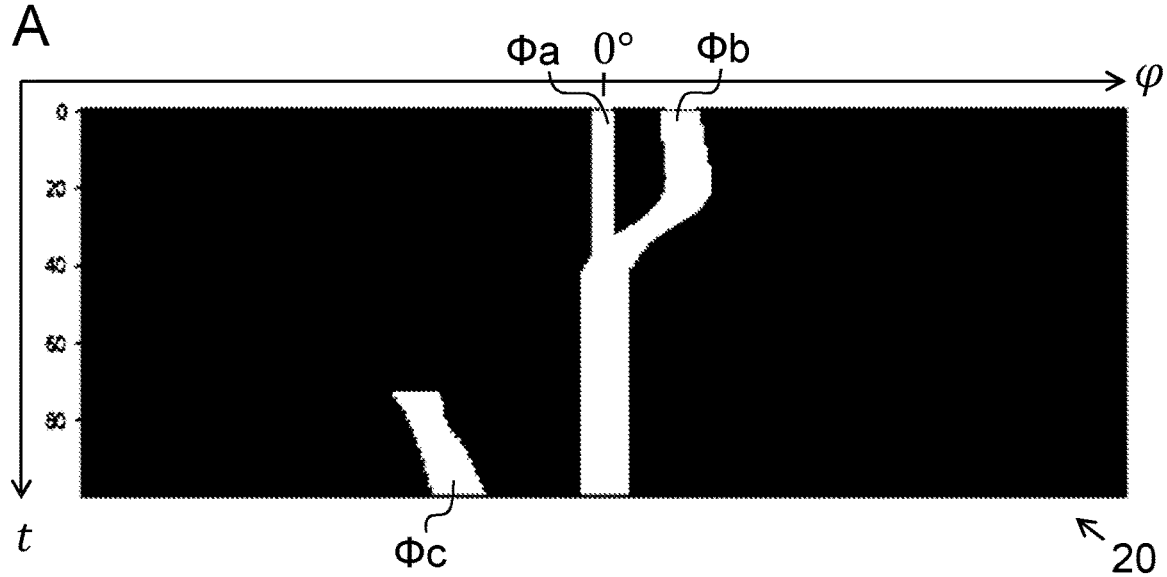
Figure 4:
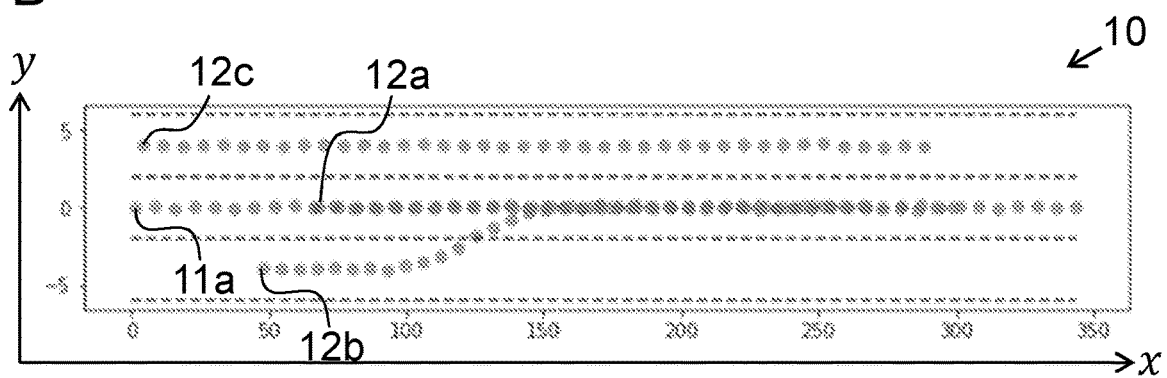
Figure 4:
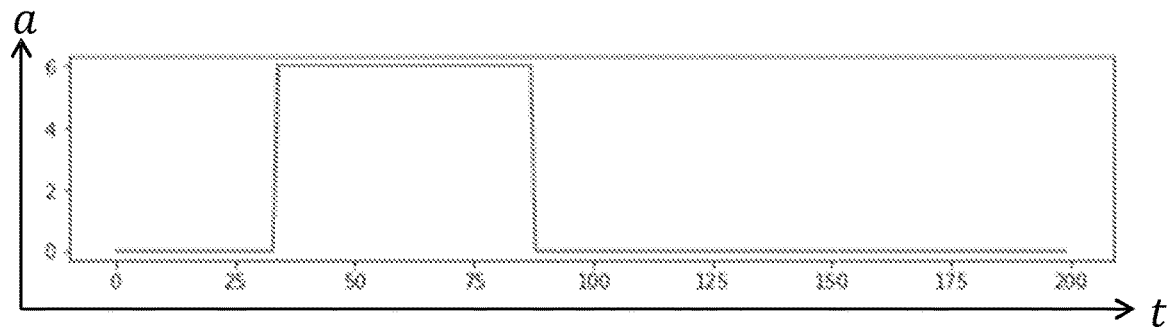
Figure 5:
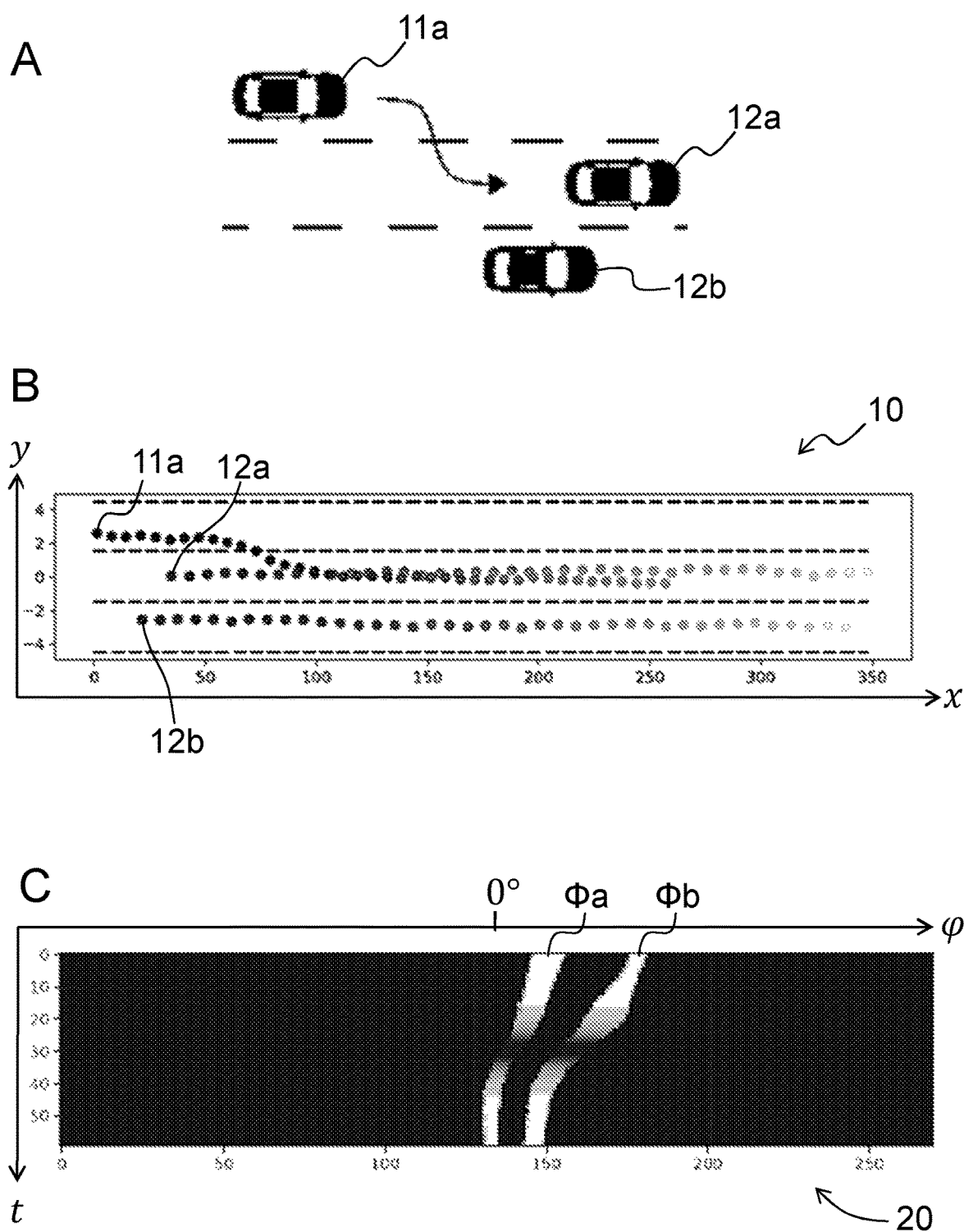
Figure 6:
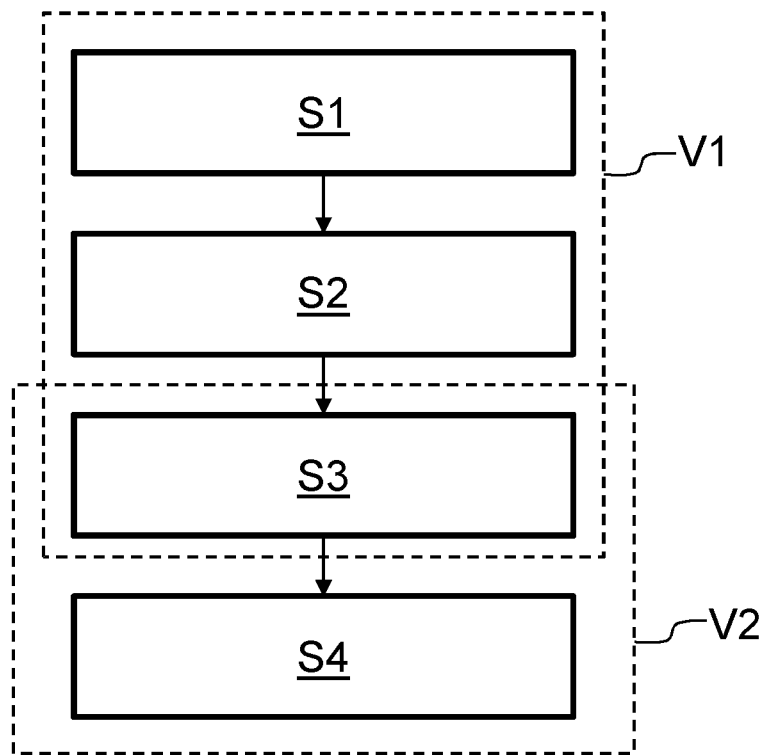
Figure 7:
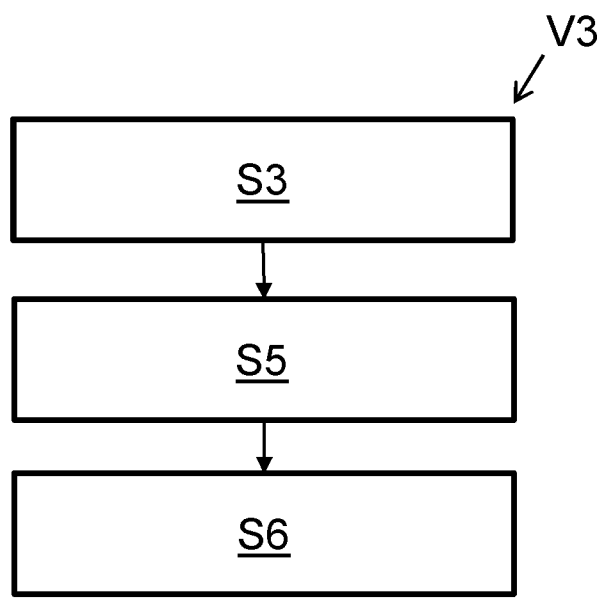

Further features, advantages and possible applications of the invention will become apparent from the following description in conjunction with the figures, in which the same reference numerals are used throughout for the same or corresponding elements of the invention. Shown therein at least partially schematically:

FIG. 1 a preferred exemplary embodiment of an inventive system for data preparation as well as of an inventive system for training an artificial neural network;

FIG. 2 a preferred exemplary embodiment of an inventive system for analyzing sensor data;

FIG. 3 an example of ascertaining an angular sector in a traffic scenario;

FIG. 4 a first example illustrating the correlation between an inventive display and a corresponding dynamic spatial scenario;

FIG. 5 a second example illustrating the correlation between an inventive display and a corresponding dynamic spatial scenario;

FIG. 6 a preferred exemplary embodiment of an inventive method for data preparation as well as of an inventive method for training an artificial neural network; and FIG. 7 a preferred exemplary embodiment of an inventive method for data evaluation.

FIG. 1 shows a respective preferred exemplary embodiment of an inventive system 100 for preparing dynamic spatial scenario data as well as an inventive system 200 for training an artificial neural network 1. The system 100 for data preparation comprises a determination module 2 and a generation module 3, wherein the determination module 2 is configured to ascertain from sensor data S a time curve of an angular sector which, from the perspective of an ego object, is covered by another object, and wherein the generation module 3 is configured to generate a display of the ascertained time curve. The system 200 for training the artificial neural network 1 comprises the generation module 3 and an interface 4, wherein the interface 4 is configured to feed the generated display to the artificial neural network 1 together with information on a dynamic spatial scenario.

The sensor data S is for example generated by environmental sensors of an ego vehicle when detecting a traffic scenario and characterize for instance the number of nearby vehicles, the relative arrangement, in particular the relative distances of the other vehicles to the ego vehicle, the speed of the ego vehicle, and/or the like. The determination module 2 can preferably ascertain from this sensor data S the width of at least one angular sector obscured by the other vehicles in the field of view of the ego vehicle and in which the position this angular sector is arranged, for example relative to the direction of travel of the ego vehicle.

Since the environmental sensors detect the surroundings of the ego vehicle preferably continuously but yet at least with high frequency, the time curve of the angular sector from the perspective of the ego vehicle, in particular a change in its width and/or its position, can be ascertained from the resulting sensor data S. The generation module 3 can use the time curve to generate a graphical display which abstractly depicts the traffic scenario. In other words, the generation module 3 is configured to encode the traffic scenario-related information contained in the sensor data S in the display, particularly in compressed form.

Preferably, the sensor data S is sensor data which is classified with respect to dynamic spatial scenarios; i.e. the sensor data S is for example assigned to one of a plurality of classes of traffic scenarios such as for instance passing maneuvers or lane changing maneuvers. This classification can for example be performed manually, for instance by viewing an image data stream. The display generated on the basis of the ascertained time curve of the angular sector can thus be transmitted from the interface 4 to the artificial neural network 1 along with information about the dynamic spatial scenario.

The artificial neural network 1 is preferably configured to recognize at least one respective pattern in all of the displays assigned to the same traffic scenario class. A template characterizing a known traffic scenario can be defined on the basis of such a recognized pattern. The templates defined in this way can be stored in a database 5 for further use, for instance for evaluating sensor data generated during a vehicle's regular operation.

FIG. 2 shows a preferred embodiment of a system 300 for analyzing sensor data S suited to characterizing a dynamic spatial scenario with respect to an ego object and at least one other object. The system 300 comprises a generation module 3 configured to generate, on the basis of the sensor data S, a display of a time curve of an angular sector which, from the perspective of the ego object, is covered by another object. The system 300 further comprises a comparison module 6 configured to compare the generated display to at least one predefined template of a known dynamic spatial scenario. To that end, the comparison module 6 preferably has access to a database 5 in which at least one predefined template is stored.

The result of the comparison is preferentially output by the comparison module 6 and can for instance be used to control a driver assistance system with which an ego vehicle is equipped. If at least one predefined measure of correspondence is for example ascertained between the generated display and the at least one predefined template, for instance by analyzing a measure of similarity generated during the comparison, it can be concluded that the known scenario is present and the comparison module 6 can output for instance a scenario class as an output signal. Alternatively or additionally, the beginning and/or end of an identified driving maneuver can also be output, in particular signaled.

FIG. 3 shows an example of ascertaining an angular sector Φ in a dynamic spatial scenario 10 in which an ego object 11 moves along a direction of movement, here along the x-axis of a coordinate system, and is surrounded by other objects 12. In the present example, the spatial scenario 10 is a traffic scenario in which an ego vehicle 11*a* is moving in the direction of travel in the center lane and is surrounded by other vehicles 12*a*, 12*b* in adjacent lanes.

FIG. 3A shows the traffic scenario from a bird's eye view, wherein the depicted display summarizes a chronological sequence of spatial scenes. The other vehicles 12*a*, 12*b* are seen in different positions relative to the ego vehicle 11*a* at different times, these being indicated by different fillings of the rectangles representing the vehicles 12*a*, 12*b*. A denser filling thereby corresponds to a position earlier in time. As is readily discernible in this display, a first vehicle 12*a* changes lanes from an outer lane to the lane used by the ego vehicle 11 *a* and thereby merges in front of the ego vehicle 11 a. A second vehicle 12*b*, which is initially at approximately the same height as the ego vehicle 11 a in relation to the direction of movement, falls back over time. Because the positional change of the second vehicle 12*b* is relatively small, the positions occupied by the second vehicle 12*b* at the different points in time overlap in this display.

In order to generate an alternative display of the traffic scenario, an angular sector can be ascertained for each of the two vehicles 12*a*, 12*b* which indicates the area in the field of view of the ego vehicle 11 a covered by the respective vehicle 12*a*, 12*b*. FIG. 3B shows an example of this for the first vehicle 12*a*. The contour 13 of the first vehicle 12*a* which results relative to the perspective of the ego vehicle 11 a is indicated as a solid line and spans angular sector Φ. A position φ of the angular sector Φ, and thus also of the first vehicle 12*a*, from the perspective of the ego vehicle 11*a* can thereby be indicated relative to a predetermined direction, for example the direction of movement. If the position of the vehicle 12*a* changes relative to the ego vehicle 11*a*, both the width of the angular sector Φ as well as its position φ can change.

This is shown in FIG. 3C. The bar chart shown therein, in which the inverse distance d between the ego vehicle 11 a and the other vehicles 12*a*, 12*b*, indicated in FIG. 3A as a black arrow, is plotted against the position φ of the angular sector Φ, constitutes an abstract display of the traffic scenarios depicted FIG. 3A. The right three bars correspond to the angular sector Φ covered by the first vehicle 12*a* while the left three bars correspond to the angular sector Φ covered by the second vehicle 12*b*. As also in FIG. 3A, the different points in time are indicated by the corresponding filling of the bars.

Thus, the angular sector Φ covered by the first vehicle 12*a* shifts toward a 0° position when merging in front of the ego vehicle 11*a*, whereby the 0° position of the angular sector Φ corresponds to a position in front of ego vehicle 11*a*. As the distance d between the first vehicle 12*a* and the ego vehicle 11 a thereby decreases as shown in FIG. 3A, the width of the angular sector Φ covered by the first vehicle 12*a* increases. In addition to the angular sector Φ width, the distance d between the first vehicle 12*a* and the ego vehicle 11 a is also encoded in the height of the bars, which increases with the passage of time.

On the other hand, the angular sector Φ covered by the second vehicle 12*b* shifts away from the 0° position as the second vehicle 12*b* falls behind the ego vehicle 11*a*. Since the distance between the second vehicle 12*b* and the ego vehicle 11 a thereby increases, the height of the bars as well as their width also decrease.

FIG. 4 shows a first example illustrating the correlation between a preferential embodiment of an inventive display 20 and a corresponding dynamic spatial scenario 10. FIG. 4A to that end shows the display 20 of time curves of angular sectors Φa, Φb, Φc covered by other objects from the perspective of an ego object, for instance ego vehicle 11*a*. The time t is plotted against the position φ of the angular sectors Φa, Φb, Φc in the display 20, wherein the 0° position corresponds to a position in front of the ego object. It is noted that the display 20 may be considered a representation 20, for purposes of the present disclosure.

The time curves of angular sectors Φa, Φb, Φc are depicted as lines, their width corresponding to the distance of the respective object from the ego object. A first object, for instance a first vehicle 12*a*, is thus initially located at some distance in front of the ego object at t=0. In contrast, a second object, e.g. a second vehicle 12*b*, is initially closer to the ego object, although in a position to the side of the ego object. At approximately t=40, the second object changes position and edges between the ego object and the first object. From this point, the time curve of the angular sector Φb covered by the second object overlaps the course of the angular sector Φa covered by the first object.

At approximately t=70, a further angular sector Φc is covered by a third object, for instance a third vehicle 12*c*. The third object is to the side of the ego object, and on that side of the ego object opposite from the side which accommodated the second object at t=0. The position φ of the angular sector Φc covered by the third object then shifts toward the 0° position. This time curve can for example be induced by a movement of the third object parallel to the ego object's direction of movement, whereby the distance of the third object to the ego object increases.

Such time curves of the angular sectors Φa, Φb, Φc can for example be characteristic of the spatial dynamic scenario 10 shown in FIG. 4B, here a traffic scenario. The chronological development is indicated in FIG. 4B by the dotted trajectories of the vehicles on the roadway.

The ego vehicle 11a is initially located at position (x=0, y=0) and the first vehicle 12a is located approximately at position (x=60, y=0). Accordingly, the first vehicle 12a is driving in a center lane at an approximate distance of Δx=60 ahead of the ego vehicle 11a. The second vehicle 12b is initially located approximately at position (x=45, y=−4), whereby it is accordingly traveling between the ego vehicle 11a and the first vehicle 12a in a neighboring lane; i.e. laterally offset relative to the ego vehicle 11a.

Over the further time curve, the second vehicle 12b merges into the center lane between the ego vehicle 11 a and the first vehicle 12a. The merging movement of the second vehicle 12b begins at approximately position (x=100, y=−4) and ends at approximately position (x=150, y=0). After the other vehicle 12b merges, the ego vehicle 11a, the first vehicle 12a and the second vehicle 12b continue traveling together in the center lane. Because the second vehicle 12b now obscures the view of the first vehicle 12a from the perspective of the ego vehicle 11a, only one line is visible in the 0° position in the corresponding FIG. 4A display 20.

The third vehicle 12c is initially behind the ego vehicle 11a such that it is not initially detected, for instance by environmental sensors of the ego vehicle 11a. The third vehicle 12c is however moving at a higher speed than the ego vehicle 11a such that in the further time curve it overtakes the ego vehicle 11 a in a further neighboring lane at y=4. The third vehicle 12c only becomes visible to the ego vehicle 11a upon passing it, such that the time curve of the angular sector Φc covered by the third vehicle 12c only starts from this point in time in the corresponding FIG. 4A display 20.

The display 20 resulting from the time curves of the angular sectors in FIG. 4A exhibit a pattern characteristic of the described spatial dynamic scenario 10. When many such displays are generated on the basis of sensor data repeatedly collected while detecting such a scenario, an artificial neural network can learn this pattern or be trained to recognize this pattern respectively. From the sensor data thereby generated, the time curve of angular sectors can then be depicted and analyzed by the trained artificial neural network, in particular compared to the learned pattern, essentially in real time during the regular operation of a vehicle. Whether or respectively at what point in time a known traffic scenario exists is thereby preferably ascertained.

FIG. 4C shows the result of such a comparison, for instance between the display 20 shown in FIG. 4A and a corresponding template, wherein an output signal a is plotted against the time t. At approximately time t=30, the output signal a jumps to value 6, whereby the presence of the known traffic scenario is signaled, in this case the merging of a second vehicle 12b. The output signal a drops back down to the value of zero at approximately time t=85, thereby signaling the end of the merging maneuver.

In addition to the start and the duration of the driving maneuver, the traffic scenario classification can also be displayed by way of the output signal a value. In another, not shown, example, the comparison of the generated display to different templates could for instance show the highest correspondence to a template associated with a veering maneuver and the output signal a correspondingly assume a different value.

FIG. 5 shows a second example illustrating the correlation between a preferential exemplary embodiment of an inventive display 20 and a corresponding dynamic spatial scenario 10. Here, FIG. 5A shows a scene from the traffic situation corresponding to dynamic spatial scenario 10, in this case the merging of an ego vehicle 11a into a lane in which another first vehicle 12a is already driving, indicated by the arrow. In addition to the first vehicle 12a, a further second vehicle 12b is driving in another lane. It is noted that the display 20 may be considered a representation 20, for purposes of the present disclosure.

The chronological development of the dynamic spatial scenario 10 is shown in FIG. 5B by the dotted trajectories of the vehicles 11a, 12a, 12b. The ego vehicle 11a is initially located approximately at position (x=0, y=2.5) and the first vehicle 12a is driving in a center lane ahead of the ego vehicle 11a approximately at position (x=35, y=0); i.e. at an approximate distance of Δx=35. The second vehicle 12b is initially located approximately at position (x=25, y=−2.5).

Over the further time curve, the ego vehicle 11a begins to merge into the center lane at approximately position (x=60, y=2) and ends the driving maneuver at approximately position (x=100, y=0). The other two vehicles 12a, 12b continue driving straight ahead at a slightly higher speed such that the ego vehicle 11a slowly drops behind.

FIG. 5C shows the time curves of angular sectors Φa, Φb in a display 20, each covered by the first vehicle 12a or second vehicle 12b respectively from the perspective of the ego vehicle 11a. Here, the time t is plotted against a position φ of angular sectors Φa, Φb. A 0° position plotted in FIG. 5c corresponds to a position in front of the ego vehicle 11a.

As described above, the angular sectors Φa, Φb shift toward the 0° position over the time curve since the first and second vehicles 12a, 12b are moving away from the ego vehicle 11a due to their higher speed. At the time the ego vehicle 11a merges, here at approximately the time of t=30, the time curves of the angular sectors Φa, Φb additionally curve in the direction of the 0° position. The angular sector Φa covered by the first vehicle 12a subsequently runs along the 0° position since, as shown FIGS. 5A and 5B, the first vehicle 12a is traveling in front of the ego vehicle 11 a in the same lane.

Based on the resulting pattern, it is initially only possible to conclude the relative movement of the ego vehicle 11 a with respect to the first and second vehicle 12a, 12b; i.e. it is not initially clear from the shape of the time curve of the angular sectors Φa, Φb whether the ego vehicle 11a is switching to the center lane or whether the first and second vehicles 12a, 12b are respectively changing lanes, in particular substantially at the same time, whereby the first vehicle 12a switches to the lane of the ego vehicle 11 a and the second vehicle 12b to the lane previously used by the first vehicle 12a.

In order to be able to distinguish between these two cases, in addition to the angular sectors Φa, Φb, the display 20 shows a value which is characteristic of the in particular transversal distance between the ego vehicle 11 a and the respective other vehicle 12a, 12b and/or of the in particular transversal speed of the ego vehicle 11 a at time t. The transversal distance or transversal speed thereby relates to a transverse component of the distance or respectively speed; i.e. the y components in the display shown in FIG. 5B.

The display 20 shows the characteristic value of the distance and/or the speed as a coloration of the angular sector time curves indicated by shading. For example, a dark shading thereby corresponds to a high transversal speed of the ego vehicle 11a. Thus, able to be seen from the display 20 in FIG. 5C is that the ego vehicle begins a transverse movement; i.e. perpendicular to the path of the lane, at approximately t=20, whereby the ego vehicle 11a reaches the highest transversal speed at approximately t=30 and the transverse movement ends at approximately t=40.

Since the ego vehicle 11a does not change its (transversal) speed when one of the other vehicles 12a, 12b changes lanes, it can be concluded in the present case that the ego vehicle 11 a has switched to the lane used by the first vehicle 12a.

FIG. 6 shows a preferential exemplary embodiment of an inventive method V1 for data preparation and an inventive method V2 for training an artificial neural network respectively.

In method step S1, sensor data is generated, for instance by sensory detection of an ego object's surroundings, and classified, i.e. assigned to different dynamic spatial scenarios. The classification can for example be performed manually, for instance by evaluating an image data stream. Alternatively, the sensor data can also be classified automatically, particularly in a case of sensor data generated by a simulator during the simulation of various dynamic spatial scenarios.

In a further method step S2, a time curve of an angular sector covered by another object from the perspective of the ego object is ascertained on the basis of the sensor data. For example, the contour of the other object, in particular the cross-sectional area, can be ascertained and its width within or proportion of the field of view of the ego object determined. Furthermore, a geometric center of gravity of the contour or the cross-sectional area respectively can be ascertained and its position in the field of view of the ego object depicted, in particular relative to the direction of movement of the ego object.

In a further method step S3, an in particular graphical display which depicts the time curve is preferably generated from the time curve of the angular sector. The time curve of the angular sector can form for example a pattern in such a display, for instance a figure. Preferably, the width of the angular sector, in particular its proportion of the field of view of the ego object, and its position in the ego object's field of view, in particular relative to the ego object's direction of movement, is depicted for each point in time at which sensor data is generated or at least one angular sector covered by another object is ascertained.

Preferentially, a speed of the ego object, in particular a transversal speed, and/or a distance, in particular a transversal distance, of the ego object to the other object is also taken into account in method step S3 when generating the display. In particular, a value can be ascertained and stored or the display colored accordingly, for instance based on a function in which parameters which preferably characterize the dynamic spatial scenario such as e.g. the speed and/or the distance are entered as input variables. Preferably, the generated display thus provides information regarding the width and position of the angular sector covered by the other object in the field of view of the ego object and the speed of the ego object and/or the distance to the other object.

In a further method step S4, the generated display is fed to an artificial neural network, for instance via an interface, which is thereby in particular trained to recognize patterns in the generated display. To that end, the artificial neural network is preferably additionally fed information on the dynamic spatial scenarios according to which the sensor data was classified in method step S1 so that the artificial neural network can in each case correlate the generated display, or the recognized pattern respectively, to one of the dynamic spatial scenarios.

FIG. 7 shows a preferential exemplary embodiment of an inventive method V3 for analyzing sensor data suited to characterizing a dynamic spatial scenario with respect to an ego object and at least one other object. The sensor data is preferably sensor data generated by environmental sensors of an ego vehicle.

In method step S3, a display of a time curve of an angular sector is generated from the sensor data. The angular sector thereby corresponds to the area in the ego object's field of view which is covered by the other object. Such a display can for example be an image in which the time curve of the angular sector forms a pattern, e.g. a figure.

Where applicable, the time curve of the angular sector can thereby also be ascertained in a separate preceding method step (not shown) on the basis of the sensor data.

In a further method step S5, the generated display is compared to at least one predefined template of a known dynamic spatial scenario. This enables the ascertaining of which dynamic spatial scenario the ego object is currently located in and, if necessary, the appropriate control of a driver assistance system.

In a further method step S6, the generated display can optionally be stored as a further predefined template, e.g. in a database, when no or at least inadequate correspondence of the generated display to the at least one predefined template associated with a known dynamic spatial scenario can be ascertained. A catalog of predefined templates suitable for identifying dynamic spatial scenarios can in this way be generated, in particular essentially in real time.

LIST OF REFERENCE NUMERALS 1 artificial neural network
2 generation module
3 determination module
4 interface
5 database
6 comparison module
10 spatial dynamic scenario
11 ego object
11a ego vehicle
12 different vehicle
12a first vehicle
12b second vehicle
12c third vehicle
13 contour
20 display or representation
100 data preparation system
200 artificial neural network training system
300 sensor data analyzing system
Φ angular sector
φ position of angular sector
S sensor data
y direction of movement
d distance
a output signal
V1 data preparation method
V2 artificial neural network training method
V3 sensor data analyzing method
S1-S6 method steps

What is claimed is:

1. A method for preparing data from dynamic spatial scenarios for processing by an artificial neural network, the method comprising:
   acquiring sensor data, wherein the sensor data characterizes a dynamic spatial scenario with respect to an ego object and at least one other object; and
   generating a representation on the basis of a progression over time of an angular sector ascertained from the sensor data, wherein the progression over time of the angular sector, from the perspective of the ego object, is covered by the at least one other object.

2. The method according to claim 1, wherein the representation is output to an artificial neural network or provided for processing by the artificial neural network.

3. The method according to claim 1, wherein the generated representation further depicts a distance of the ego object to the at least one other object and/or a speed of the ego object, wherein the distance and/or the speed is/are likewise ascertained from sensor data.

4. The method according to claim 1, wherein the progression over time of the angular sector is represented by a line, a width of which indicates a value of the respectively present angular sector, and/or wherein a distance of the ego object to the at least one other object and/or a speed of the ego object is/are depicted by a stored value or a coloration at the respective point on the line corresponding to a time of a presence of the distance and/or the speed.

5. The method of claim 1, wherein the dynamic spatial scenarios are traffic scenarios, wherein the ego object is an ego vehicle, and wherein the at least one other object includes another vehicle.

6. The method of claim 1, wherein the progression of the angular sector in the generated representation forms a pattern over time.

7. The method of claim 6, wherein the pattern over time represents movement of the at least one other object relative to the ego object.

8. The method of claim 7, wherein the covered angular sector increases in size as the at least one other object moves closer to the ego object and decreases in size as the at least one other object moves away from the ego object.

9. A computer-supported method for training an artificial neural network on the basis of sensor data that characterizes a known dynamic spatial scenario with respect to an ego object and at least one other object, the method comprising:
   generating a representation on the basis of a progression over time of an angular sector from the sensor data, wherein the progression over time of the angular sector, from the perspective of the ego object, is covered by the at least one other object, and
   wherein the generated representation is fed to the artificial neural network together with information about the spatial scenario.

10. The computer-supported method of claim 9, wherein the ego object is an ego vehicle, and wherein the least one other object includes another vehicle.

11. A computer-supported method for analyzing sensor data that characterizes a dynamic spatial scenario with respect to an ego object and at least one other object, the method comprising:
   generating a representation on the basis of a progression over time of an angular sector from the sensor data, wherein the progression over time of the angular sector, from the perspective of an ego object, is covered by the at least one other object, and wherein the generated representation is compared to at least one predefined template of a known dynamic spatial scenario.

12. The method according to claim 11, wherein the known dynamic spatial scenario is classified on the basis of the comparison.

13. The method according to claim 11, wherein a template for a new dynamic spatial scenario is defined when the generated representation cannot be assigned to the at least one predefined template of the known dynamic spatial scenario.

14. The computer-supported method of claim 11, wherein the ego object is an ego vehicle, and wherein the at least one other object includes another vehicle.

* * * * *